United States Patent
Tsubosaka

(10) Patent No.: US 9,466,851 B2
(45) Date of Patent: Oct. 11, 2016

(54) FUEL-CELL GAS DIFFUSION LAYER AND METHOD OF FORMING THE SAME

(71) Applicant: Kenji Tsubosaka, Toyota (JP)

(72) Inventor: Kenji Tsubosaka, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/411,663

(22) PCT Filed: Apr. 22, 2013

(86) PCT No.: PCT/JP2013/061804
§ 371 (c)(1),
(2) Date: Dec. 29, 2014

(87) PCT Pub. No.: WO2014/006957
PCT Pub. Date: Jan. 9, 2014

(65) Prior Publication Data
US 2015/0194688 A1 Jul. 9, 2015

(30) Foreign Application Priority Data
Jul. 2, 2012 (JP) .................... 2012-148506

(51) Int. Cl.
*H01M 4/86* (2006.01)
*H01M 4/88* (2006.01)
(Continued)

(52) U.S. Cl.
CPC ......... *H01M 8/1002* (2013.01); *H01M 4/8605* (2013.01); *H01M 4/8642* (2013.01); *H01M 4/8807* (2013.01); *H01M 4/8821* (2013.01); *H01M 4/8828* (2013.01);
(Continued)

(58) Field of Classification Search
CPC .......... H01M 4/8605; H01M 4/8828; H01M 4/8807; H01M 4/8885; H01M 4/1004; H01M 4/1002; H01M 8/0245; H01M 8/0243; H01M 8/0234; H01M 8/1004; H01M 8/1002; H01M 8/0239; H01M 2008/1095; Y02E 60/521
USPC .......................................... 429/480; 427/115
See application file for complete search history.

(56) References Cited

U.S. PATENT DOCUMENTS

| 2002/0031696 A1 | 3/2002 | Kawahara et al. |
| 2002/0045089 A1 | 4/2002 | Kawahara et al. |

(Continued)

FOREIGN PATENT DOCUMENTS

| JP | 2002-124266 A | 4/2002 |
| JP | 2002170572 A | 6/2002 |

(Continued)

OTHER PUBLICATIONS

Machine Translation in English of JP 2005222813.*

*Primary Examiner* — Sarah A Slifka
(74) *Attorney, Agent, or Firm* — Kenyon & Kenyon LLP

(57) ABSTRACT

This fuel-cell gas diffusion layer includes a conductive porous layer constituted by: porous carbon formed so as to have a porosity distribution substantially uniform in a stacking direction with respect to a membrane electrode assembly; and a PTFE resin arranged dispersedly across the inside of the carbon. When a ratio of a surface of the carbon to a surface that is exposed without being covered with the PTFE resin is defined as an exposure ratio, the exposure ratio of a surface, on a cathode electrode side, of the conductive porous layer, is higher than the exposure ratio, on a diffusion-layer base material side, of the conductive porous layer.

4 Claims, 3 Drawing Sheets

(51) Int. Cl.
*H01M 8/10* (2016.01)
*H01M 8/02* (2016.01)

(52) U.S. Cl.
CPC ....... *H01M 4/8882* (2013.01); *H01M 4/8885* (2013.01); *H01M 8/0243* (2013.01); *H01M 8/0245* (2013.01); *H01M 8/1004* (2013.01); *H01M 8/0234* (2013.01); *H01M 8/0239* (2013.01); *H01M 2008/1095* (2013.01); *Y02E 60/521* (2013.01)

(56) References Cited

U.S. PATENT DOCUMENTS

2002/0068215 A1    6/2002  Hamada et al.
2005/0197246 A1*   9/2005  Yoshida ............. H01M 4/8605
                                                          502/101
2010/0255407 A1   10/2010  Kim et al.

FOREIGN PATENT DOCUMENTS

| JP | 2003-109604 A  |   | 4/2003  |
| JP | 2005-222813 A  |   | 8/2005  |
| JP | 2005222813 A   | * | 8/2005  |
| JP | 2005-243295 A  |   | 9/2005  |
| JP | 2006-004879 A  |   | 1/2006  |
| JP | 2006-310201 A  |   | 11/2006 |
| JP | 2008-277093 A  |   | 11/2008 |
| JP | 2009-004102 A  |   | 1/2009  |
| JP | 2009-009839 A  |   | 1/2009  |
| JP | 2009-016171 A  |   | 1/2009  |
| JP | 2011-171182 A  |   | 9/2011  |
| KR | 20050054467 A  |   | 6/2005  |

* cited by examiner

FUEL-CELL GAS DIFFUSION LAYER AND METHOD OF FORMING THE SAME

CROSS-REFERENCE TO RELATED APPLICATIONS

This is a US national phase application based on the PCT International Patent Application No. PCT/JP2013/061804 filed on Apr. 22, 2013, and claiming the priority of Japanese Patent Application No. 2012-148506 filed on Jul. 2, 2012, the entire contents of which are herewith incorporated by reference.

TECHNICAL FIELD

The present invention relates to a fuel-cell gas diffusion layer that is stacked on a membrane electrode assembly and a method of forming the same.

BACKGROUND ART

A fuel cell of a polymer electrolyte fuel cell has a structure comprising: a membrane electrode assembly (MEA) which has been prepared by forming catalyst layers on respective surfaces of an electrolyte membrane having hydrogen ion conductivity; and gas diffusion layers (fuel-cell gas diffusion layers) stacked on the respective catalyst layers of the membrane electrode assembly. Reaction gases (fuel gas and oxidant gas) are respectively supplied to the gas diffusion layers, thereby generating electric power.

A catalyst layer is obtained by having carbon support platinum and then having the resultant product contain an electrolyte material (ionomer), and such catalyst layer constitutes an electrode layer that produces an electric-power generation reaction due to a supplied reaction gas. The catalyst layer formed on one of the surfaces of the membrane electrode assembly (MEA) constitutes an anode (fuel electrode), and the catalyst layer formed on the other surface thereof constitutes a cathode (air electrode).

A gas diffusion layer is a layer that is formed so as to enhance the diffusion property of a reaction gas, and such gas diffusion layer is arranged on a corresponding catalyst layer such that a reaction gas is uniformly supplied throughout the catalyst layer. Further, a gas diffusion layer has the function of discharging product water or humidified water from a catalyst layer and the function of effectively removing a current from a catalyst layer. In recent times, in order to further improve such functions of a gas diffusion layer, forming a conductive porous layer on a surface of a gas diffusion layer, which contacts a catalyst layer, has been employed.

This conductive porous layer is a porous layer that is made of a material having water repellency and conductivity and that is provided with an enormous number of fine pores. Thus, the function of discharging product water and humidified water is improved, and further, the function of removing a current from a catalyst layer is improved due to the increase of a contact area with the catalyst layer. A gas diffusion layer having such conductive porous layer is created, for example, by coating, onto one surface of a diffusion-layer base material consisting of carbon paper or carbon cloth, a pasty coating material prepared by mixing a conductive material and a water-repellent material and then baking the coated coating material via heating. The heated coating material then serves as a conductive porous layer.

A fuel cell is created by: respectively bringing conductive porous layers of gas diffusion layers into contact with catalyst layers of a membrane electrode assembly so as to achieve a state in which the membrane electrode assembly is sandwiched by the two gas diffusion layers; and subjecting the resultant product to joining via hot pressing, etc.

In light of the adhesion between a conductive porous layer and a catalyst layer, it is desirable for a conductive porous layer to have a lower porosity. On the other hand, in light of the gas diffusion of a conductive porous layer, it is desirable for a conductive porous layer to have a higher porosity. In order to satisfy such contradictory requests, Patent Document 1 below discloses a conductive porous layer having a two-layer structure in which a layer thereof on the catalyst layer side has a low porosity; and a layer thereof on the diffusion-layer base material side has a high porosity. With such configuration, the adhesion between a conductive porous layer and a catalyst layer can be improved while the gas diffusion throughout a conductive porous layer can also be improved.

PRIOR ART REFERENCE

Patent Document

Patent Document 1: JP2009-016171 A

SUMMARY OF THE INVENTION

Problem to be Solved by the Invention

Carbon paper or the like which is used as a diffusion-layer base material is fibrous, and thus, a large amount of fluff (carbon fiber) protrudes from a surface thereof. Such fluff is known to possibly damage the electrolyte membrane of a membrane electrode assembly, when, for example, performing hot-pressing with the membrane electrode assembly being sandwiched by gas diffusion layers. When fluff is penetrated in an electrolyte membrane, cross leakage of a reaction gas occurs, leading to a significant decrease in the electric-power generation performance of a fuel cell. Further, conduction may occur between an anode and a cathode.

In particular, regarding the conductive porous layer disclosed in Patent Document 1 above, there is a high possibility that, because a part thereof contacting with the diffusion-layer base material has a high porosity, fluff will tend to enter the conductive porous layer from the diffusion-layer base material and that such fluff will pierce the conductive porous layer to reach the electrolyte membrane. As described above, a conventional fuel-cell gas diffusion layer has involved a problem in that, when attempting to sufficiently improve the adhesion between a conductive porous layer and a catalyst layer and the gas diffusion of a conductive porous layer, the durability against fluff is impaired.

The present invention has been made in light of the above-stated problem, and an object of the present invention is to provide a fuel-cell gas diffusion layer which not only sufficiently achieves the adhesion between a conductive porous layer and a catalyst layer and the gas diffusion of a conductive porous layer but which also does not lose the durability against fluff, and a method of forming such fuel-cell gas diffusion layer.

Means for Solving the Problem

In order to solve the above problem, the present invention provides a fuel-cell gas diffusion layer that is obtained by forming a conductive porous layer on one surface of a sheet-shaped diffusion-layer base material and that is stacked on a membrane electrode assembly in a state in which the conductive porous layer is in contact with a catalyst layer of the membrane electrode assembly, wherein the conductive porous layer comprises: a porous conductive member formed so as to have a porosity distribution substantially uniform in a stacking direction with respect to the membrane electrode assembly; and a water-repellent member that is arranged dispersedly across an inside of the conductive member, and wherein, when a ratio of a surface of the conductive member to a surface that is exposed without being covered with the water-repellent member is defined as an exposure ratio, the exposure ratio of a surface, on a catalyst layer side, of the conductive porous layer, is higher than the exposure ratio, on a diffusion-layer base material side, of the conductive porous layer.

A fuel-cell gas diffusion layer according to the present invention has a configuration in which a conductive porous layer is formed on one surface of a sheet-shaped diffusion-layer base material, and the conductive porous layer includes a porous conductive member and a water-repellent member arranged dispersedly across the inside of the conductive member. More specifically, a state is reached in which: a conductive member forms a porous aggregate; and a part of a surface of the aggregate is covered with a dispersedly arranged water-repellent member. With such configuration, the conductive porous layer serves as a porous layer having conductivity and water repellency.

A conductive member is formed so as to have a porosity distribution substantially uniform in a stacking direction with respect to a membrane electrode assembly, that is, a direction perpendicular to a surface of a diffusion-layer base material. Thus, in such conductive porous layer, a layer having, at a part thereof, distributed pores larger than those in the other part, that is, a layer locally having large pores, is not formed, and thus, the entry of fluff is prevented throughout the conductive porous layer.

Meanwhile, a pore of a conductive porous layer needs to be of a size which is capable of sufficiently ensuring the gas diffusion (gas permeability) of the conductive porous layer. As a result, when a porosity distribution is substantially uniform throughout a conductive porous layer, as is described above, a porosity of a surface thereof on the catalyst layer side is higher than that of a conventional one (for example, the one disclosed in Patent Document 1 above), and therefore, this may lead to a reduction in the adhesion between a catalyst layer and a conductive porous layer.

In light of the above, the present invention ensures the adhesion between a catalyst layer and a conductive porous layer by providing different states of a water-repellent member in a conductive porous member between the diffusion-layer base material side and the catalyst layer side. That is, when a ratio of a surface of a conductive member to a surface that is exposed without being covered with a water-repellent member is defined as an exposure ratio, the exposure ratio of a surface, on the catalyst layer side, of a conductive porous layer, is higher than the exposure ratio of a surface, on the diffusion-layer base material side, of the conductive porous layer.

The studies of the present inventors have revealed that a catalyst layer and a conductive porous layer bind (adhere) to each other by an affinity that acts between an ionomer contained in the catalyst layer and a conductive member (for example, carbon) in the conductive porous layer. In the present invention, the exposure ratio of the surface, on the catalyst layer side, of a conductive porous layer, that is, the surface thereof on the side opposite to a diffusion-layer base material is high, and thus, a large part of the surface of a conductive member (surface of an aggregate for attaining porosity) is exposed, leading to the above affinity being large. As a result, the adhesion between a conductive porous layer and a catalyst layer is sufficiently improved.

As stated above, a fuel-cell gas diffusion layer according to the present invention not only sufficiently achieves the adhesion between a conductive porous layer and a catalyst layer and the gas diffusion of a conductive porous layer but also sufficiently ensures the durability against fluff.

Further, the present invention provides a method of forming a fuel-cell gas diffusion layer that is obtained by forming a conductive porous layer on one surface of a sheet-shaped diffusion-layer base material and that is stacked on a membrane electrode assembly in a state in which the conductive porous layer is in contact with a catalyst layer of the membrane electrode assembly, the method comprising: a preparation step of preparing a pasty coating material obtained by mixing a conductive material and a water-repellent material; a coating step of coating the coating material onto one surface of the diffusion-layer base material so as to form a layer to be baked; and a baking step of heating the layer to be baked, wherein, in the baking step, heating is performed while maintaining a state in which a temperature of a part of the layer to be baked which contacts with the diffusion-layer base material is higher than a temperature of a surface of the layer to be baked which is opposite the diffusion-layer base material.

The method of forming a fuel-cell gas diffusion layer according to the present invention comprises a preparation step, a coating step and a baking step. The preparation step is a step of preparing a pasty coating material obtained by mixing a conductive material and a water-repellent material. Such coating material serves as a raw material for a conductive porous layer having conductivity and water repellency.

The coating step is a step of coating the coating material prepared in the preparation step onto one surface of a sheet-shaped diffusion-layer base material. Through such step, a layer to be baked which consists of a coating material is formed on one surface of a diffusion-layer base material.

The baking step is a step of heating the layer to be baked which has been formed in the coating step. Such layer to be baked is heated (baked) so as to serve as a conductive porous layer. At this point, the entire layer to be baked is not heated at a uniform temperature, but heated while being maintained in a state in which a part thereof which contacts with a diffusion-layer base material has a temperature higher than that of the surface thereof on the side opposite to the diffusion-layer base material.

As a result of heating a layer to be baked while being maintained in a state involving a temperature difference between the surfaces thereof, the porosity distribution of a conductive porous layer is substantially uniform in all parts; meanwhile, the state of a water-repellent member in the conductive porous layer is different between the surface thereof on the diffusion-layer base material side and the surface on the catalyst layer side. That is, regarding the surface, on the diffusion-layer base material side, which is maintained at a relatively high temperature, the water-repellent member melts, resulting in a state of having a low viscosity, whereby a large part of the surface of the conductive member (aggregate) is covered with the water-repellent material (the exposure ratio is low). Meanwhile, regarding the surface on the catalyst layer side which is maintained at a relatively low temperature, the viscosity of the water-repellent member is not reduced by very much, leading to the water-repellent member having a low fluidity, and in such way a state is reached in which a large part of the surface of the conductive member is exposed without being covered with the water-repellent member (the exposure ratio is high).

As described above, with the method of forming a fuel-cell gas diffusion layer according to the present invention, a conductive porous layer having a porosity distribution substantially uniform in a direction perpendicular to a surface thereof is formed, wherein the exposure ratio of the surface thereof on the catalyst layer side is higher than the exposure ratio of the surface thereof on the diffusion-layer base material side. That is, a fuel-cell gas diffusion layer can be formed which ensures the durability against fluff as well as sufficiently improving the adhesion between a conductive porous layer and a catalyst layer and also improving the gas diffusion throughout a conductive porous layer.

Further, with the method of forming a fuel-cell gas diffusion layer according to the present invention, it is also preferable that, in the baking step, heating is performed while maintaining a state in which a temperature of a part of the layer to be baked which contacts the diffusion-layer base material is higher than the melting point of the water-repellent material, and also maintaining a state in which a temperature of the surface, on the side opposite to the diffusion-layer base material, of the layer to be baked is lower than the melting point of the water-repellent member.

In such preferred aspect, in the baking step, heating is performed while maintaining a state in which a temperature of a part of the layer to be baked which contacts the diffusion-layer base material is higher than the melting point of the water-repellent material; meanwhile, heating is performed while maintaining a state in which a temperature of the surface, on the side opposite to the diffusion-layer base material, of the layer to be baked is lower than the melting point of the water-repellent member.

Due to heating performed while maintaining such temperature distribution, regarding the surface on the diffusion-layer base material side, the water-repellent member melts, resulting in a state of having a low viscosity, whereby a large part of the surface of the conductive member is reliably covered with the water-repellent member (the exposure ratio is low); meanwhile, regarding the surface on the catalyst layer side, the water-repellent member barely flows, whereby a state is reached in which a large part of the surface of the conductive member is exposed without being covered with the water-repellent member (the exposure ratio is high)

As described above, in such preferred aspect, a conductive porous layer having a porosity distribution substantially uniform in a direction perpendicular to a surface thereof is reliably formed, wherein the exposure ratio of the surface thereof on the catalyst layer side is higher than the exposure ratio of the surface thereof on the diffusion-layer base material side.

Effect of the Invention

According to the present invention, a fuel-cell gas diffusion layer which not only sufficiently achieves the adhesion between a conductive porous layer and a catalyst layer and the gas diffusion of a conductive porous layer but which also does not lose the durability against fluff, and a method of forming such fuel-cell gas diffusion layer can be provided.

BEST MODE FOR CARRYING OUT THE INVENTION

Figure 1:
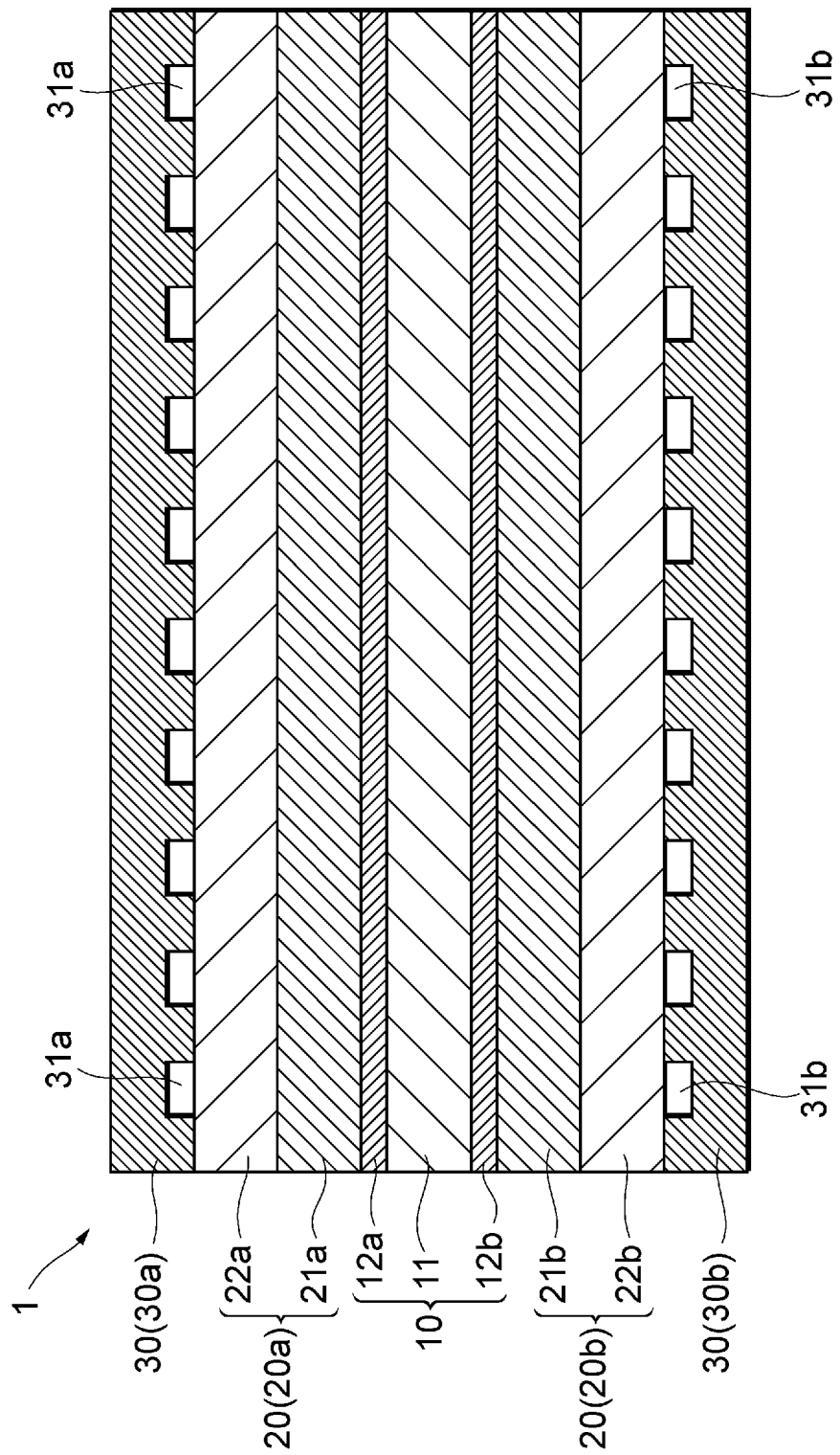
FIG. 1 is a sectional view of a fuel cell comprising fuel-cell gas diffusion layers according to an embodiment of the present invention.

An embodiment of the present invention will hereinafter be described with reference to the attached drawings. In order to facilitate the understanding of the description, like components are denoted by like reference symbols as much as possible in the drawings and will not be further explained.

FIG. 1 is a sectional view of a fuel cell comprising fuel-cell gas diffusion layers according to an embodiment of the present invention. A fuel cell 1 is a so-called planar type polymer electrolyte fuel cell (PEFC) and is formed into a rectangular shape in a planar view. As shown in FIG. 1, the fuel cell 1 comprises a membrane electrode assembly 10, a pair of gas diffusion layers 20 and a pair of separators 30.

The membrane electrode assembly 10 includes a cathode electrode 12a and an anode electrode 12b on respective sides of an electrolyte membrane 11 with hydrogen ion conductivity, and is referred to as a so-called MEA. The cathode electrode 12a and the anode electrode 12b are formed, on the respective surfaces of the electrolyte membrane 11, as catalyst layers (electrode layers) obtained by: having carbon particles support platinum fine particles; and having the resultant product contain an electrolyte (ionomer). The cathode electrode 12a is a catalyst layer that reacts with an oxidant gas (for example, air), and the anode electrode 12b is a catalyst layer that reacts with a fuel gas (for example, hydrogen).

The gas diffusion layers 20 are layers for enhancing the diffusion of reaction gases, and are arranged so as to sandwich both surfaces of the membrane electrode assembly 10 therebetween. That is, the fuel cell 1 has the two gas diffusion layers 20, which consist of a cathode-side gas diffusion layer 20a and an anode-side gas diffusion layer 20b. The cathode-side gas diffusion layer 20a is stacked on the cathode electrode 12a for the electrolyte membrane 11, and the anode-side gas diffusion layer 20b is stacked on the anode electrode 12b for the electrolyte membrane 11.

These two gas diffusion layers 20 each have a configuration in which a conductive porous layer (21a, 21b), formed from a material having conductivity and water repellency, is provided on one surface of a diffusion-layer base material (22a, 22b) consisting of carbon paper. Each of the gas diffusion layers 20 is arranged such that a surface of the conductive porous layer (21a, 21b) faces the membrane electrode assembly 10. Thus, the conductive porous layer 21a is in contact with the cathode electrode 12a, and the conductive porous layer 21b is in contact with the anode electrode 12b. The gas diffusion layers 20 have the function of enhancing the diffusion of reaction gases, as well as the function of discharging product water and humidified water from the membrane electrode assembly 10 side and the function of efficiently removing currents from the cathode electrode 12a and the anode electrode 12b. The specific configuration and manufacturing method of the gas diffusion layers 20 will be described in detail below.

The separators 30 are conductive layers arranged on the outermost side of the fuel cell 1, and are formed of carbon. The separators 30 consist of a cathode-side separator 30a, which is arranged so as to be adjacent to the cathode-side gas diffusion layer 20a, and an anode-side separator 30b, which is arranged so as to be adjacent to the anode-side gas diffusion layer 20b, and these separators have the same shape.

On a surface of the cathode-side separator 30a which contacts with the diffusion-layer base material 22a, a plurality of grooves 31a with a rectangular cross-section are formed so as to be arranged parallel to one another. These grooves 31a are flow paths for sharing an oxidant gas with the outside with respect to the diffusion-layer base material 22a. Similarly, on a surface of the anode-side separator 30b which contacts with the diffusion-layer base material 22b, a plurality of grooves 31b with a rectangular cross-section are formed so as to be arranged parallel to one another. These grooves 31b are flow paths for sharing a fuel gas with the outside with respect to the diffusion-layer base material 22b.

FIG. 1 shows one fuel cell 1 (single cell) only; however, in an actual fuel cell apparatus, multiple fuel cells 1 are stacked so as to be brought into a state of being electrically connected to one another in series via the separators 30 (cell stack). The power-generation voltage of one fuel cell 1 is approximately 1 V, but the above-described multiple fuel cells 1 connected in series allow for a high voltage of several hundred V to be output. As described above, the separators 30 have the role of electrically connecting the multiple fuel cells 1 and the role of supplying reaction gases to the respective fuel cells 1. It should be noted that a coolant flow path for cooling the fuel cell 1 may be formed between the cathode-side separator 30a and the anode-side separator 30b which are adjacent to each other.

Figure 2:
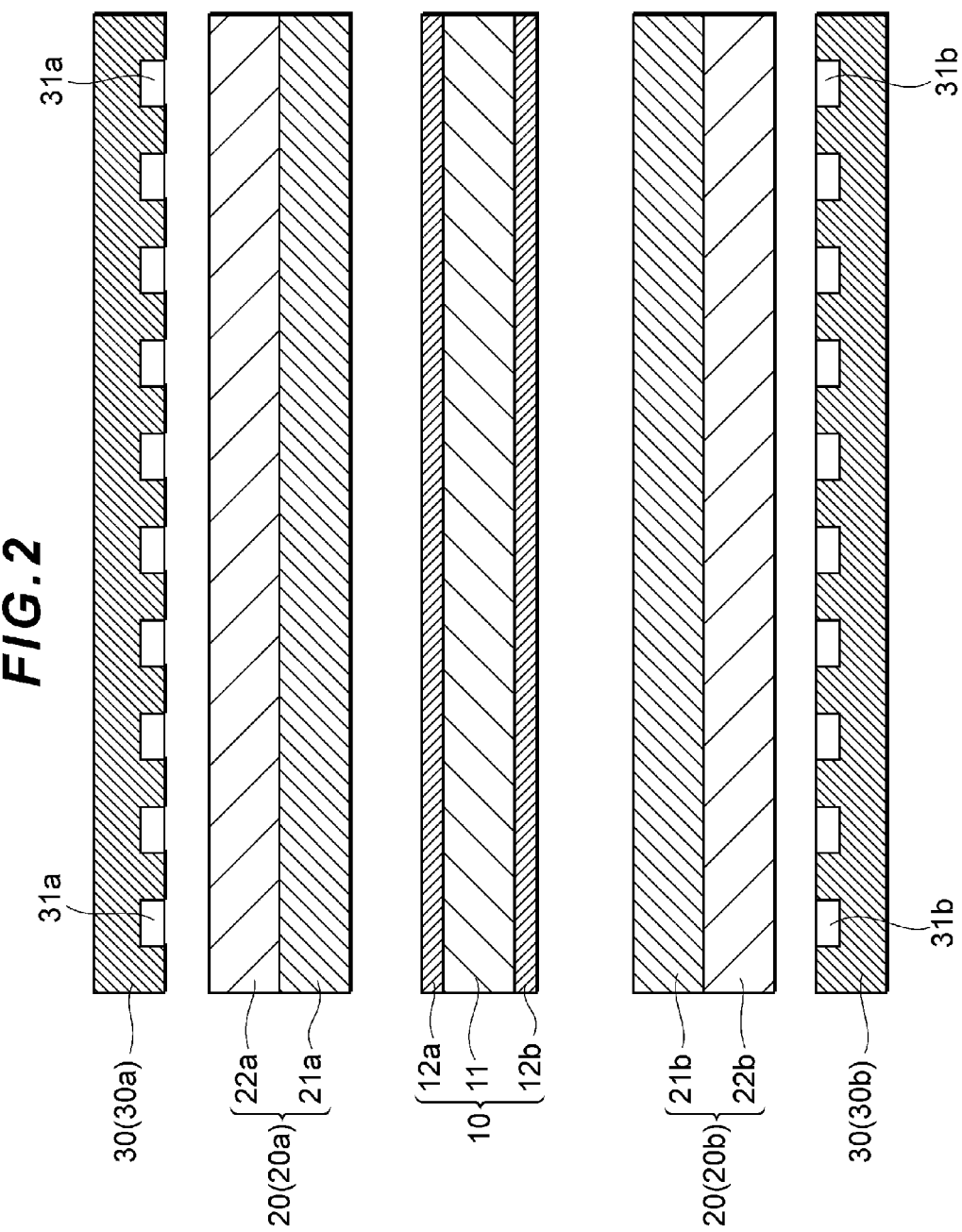
FIG. 2 is an exploded view for illustrating a method of manufacturing the fuel cell shown in FIG. 1.

A method of manufacturing a fuel cell 1 with the above-described configuration will be described briefly, with reference to FIG. 2. FIG. 2 is an exploded view for illustrating a method of manufacturing the fuel cell 1. As shown in FIG. 2, firstly, the membrane electrode assembly 10, in the state in which the electrolyte membrane 11 is provided with the cathode electrode 12a and the anode electrode 12b; and the cathode-side gas diffusion layer 20a and the anode-side gas diffusion layer 20b, are each separately created.

Then, a state is reached in which: the conductive porous layer 21a is brought into contact with the cathode electrode 12a of the membrane electrode assembly 10; and the conductive porous layer 21b is brought into contact with the anode electrode 12b of the membrane electrode assembly 10. That is, a state is reached in which the respective surfaces of the membrane electrode assembly 10 are sandwiched by the cathode-side gas diffusion layer 20a and the anode-side gas diffusion layer 20b.

A hot pressing process is performed in this state, thereby joining and integrating the cathode-side gas diffusion layer 20a, the membrane electrode assembly 10 and the anode-side gas diffusion layer 20b. The resultant product is then sandwiched by the cathode-side separator 30a and the anode-side separator 30b. It should be noted that, with the fuel cell 1 alone, the joining of the separators 30 and the gas diffusion layers 20 is not particularly performed. The separators 30 and the gas diffusion layers 20, with a cell stack configured by stacking the multiple fuel cells 1, are fixed by being held to be compressed entirely in the stacking direction.

Next, a specific method of manufacturing the cathode-side gas diffusion layer 20a will be described. It should be noted that the explanation of the structure and manufacturing method of the anode-side gas diffusion layer 20b will be omitted as they are substantially the same as those of the cathode-side gas diffusion layer 20a.

Firstly, as a raw material for the conductive porous layer 21a, a pasty coating material obtained by mixing a conductive material and a water-repellent material is prepared (preparation step). In this embodiment, carbon particles were used as a conductive material, and a fibrous PTFE resin was used as a water-repellent material. A solvent is added to these materials, and they are then mixed sufficiently, thereby obtaining a coating material in a state in which the carbon particles and the PTFE resin are uniformly dispersed.

Subsequently, the diffusion-layer base material 22a, which consists of carbon paper, is prepared, and the above coating material is coated onto one surface of the diffusion-layer base material 22a (coating step). The coating material is coated such that the thickness after coating is entirely uniform, and a layer to be baked is formed on the surface of the diffusion-layer base material 22a. The layer to be baked is a layer that will serve as the conductive porous layer 21a after being heated in a subsequent baking step.

The layer to be baked which has been formed in the coating step has a uniform thickness, as described above, and is in a state in which the carbon particles and the PTFE resin are dispersed uniformly. That is, the respective density distributions of the carbon particles and the PTFE resin are in a uniform state both in the direction along the surfaces of the layer to be baked and in the thickness direction.

The diffusion-layer base material 22a in a state of being provided, on one surface thereof, with the layer to be baked, is then put in a heating furnace and is thus entirely heated (baking step). Heating allows the layer to be baked (coating material) to get rid of the solvent, and the carbon particles become an aggregate with a steric network structure, whereby a porous layer is formed. The PTFE resin is brought into a state of being arranged in a dispersed manner inside the porous layer, resulting in a state in which the dispersed PTFE resin covers a part of the aggregate (carbon).

In the baking step, heating is not performed entirely at a uniform temperature, but heating is performed while maintaining a state in which there is a temperature difference between the surfaces of a layer to be baked. More specifically, heating is performed while maintaining a state in which the temperature of the part of the layer to be baked which contacts with the diffusion-layer base material 22a is higher than that of the surface, on the side opposite to the diffusion-layer base material 22a, of the layer to be baked.

In this embodiment, heating was performed while the temperature of the part of the layer to be baked which contacts with the diffusion-layer base material 22a was maintained at a high level of above 327° C., being the melting point of the PTFE resin. Further, heating was performed while the temperature of the surface, on the side opposite to the diffusion-layer base material 22a, of the layer to be baked was maintained at a lower level of below 327° C. Such heating with a maintained temperature difference may be achieved, in a heating furnace, by, for example, arranging a heater only for the surface on one side (diffusion-layer base material 22a side) of a layer to be baked or cooling the surface on the other side (side opposite to the diffusion-layer base material 22a) of the layer to be baked.

The conductive porous layer 21a formed through the above-described baking step has a porosity distribution which is substantially the same in all parts. In other words, the density of carbon serving as a porous aggregate is substantially uniform in all parts. Similarly, the density of the PTFE resin arranged in a dispersed manner inside the conductive porous layer 21a is substantially uniform in all parts.

Meanwhile, the state of the PTFE resin in the conductive porous layer 21a is different between the surface thereof on the diffusion-layer base material 22a side and the surface on the opposite side (cathode electrode 12a side). That is, regarding the surface on the diffusion-layer base material 22a, which is maintained at a relatively high temperature, the PTF resin melts, leading to a low viscosity state, whereby a large part of the surface of the carbon as an aggregate is covered with the PTFE resin. Meanwhile, regarding the surface on the cathode electrode 12a side, which is maintained at a relatively low temperature, the viscosity of the PTFE resin is not reduced by very much, leading to the PTFE resin having a low fluidity, whereby a state is reached in which a large part of the surface of the carbon as an aggregate is exposed without being covered with the PTFE resin.

Here, a ratio of the surface of the carbon as an aggregate to a surface that is an exposed surface without being covered with a PTFE resin is defined as an exposure ratio. As described above, the exposure ratio of the surface on the cathode electrode 12a side (side opposite to the diffusion-layer base material 22a) of the conductive porous layer 21a, is higher than the exposure ratio of the surface on the diffusion-layer base material 22a side of the conductive porous layer 21a.

The effect of providing different exposure ratios of the respective surfaces of the conductive porous layer 21a, as is described above, will now be described. The studies of the present inventors have revealed that the cathode electrode 12a and the conductive porous layer 21a bind (adhere) to each other by an affinity that acts between the ionomer contained in the cathode electrode 12a and the carbon that constitutes an aggregate in the conductive porous layer 21a. In this embodiment, the exposure ratio of the surface on the cathode electrode 12a side, that is, on the opposite side to the diffusion-layer base material 22a of the conductive porous layer 21a, is high, and a large part of the carbon (aggregate) surface is thus exposed, leading to the above affinity being large. As a result, the adhesion between the conductive porous layer 21a and the cathode electrode 12a has been sufficiently improved.

In this embodiment, because the porosity of the conductive porous layer 21a is uniform in all parts (at least in the thickness direction), the porosity of a part thereof close to the cathode electrode 12a is not particularly smaller than that of the other part. Thus, in view of the point of securing a certain level of (high) porosity in order to ensure the gas diffusion of the conductive porous layer 21a, the contact area between the cathode electrode 12a and the conductive porous layer 21a is smaller than a conventional one. However, in this embodiment, the exposure ratio is adjusted as described above, thereby sufficiently ensuring the adhesion between the cathode electrode 12a and the conductive porous layer 21a.

Meanwhile, because the porosity of the conductive porous layer 21a is uniform in all parts (at least in the thickness direction), the porosity of a part thereof close to the diffusion-layer base material 22a is not particularly greater than that of any other part. Thus, fluff is prevented from entering the conductive porous layer 21a from the diffusion-layer base material 22a consisting of a carbon cloth.

As described above, the cathode-side gas diffusion layer 20a according to this embodiment not only sufficiently ensures the adhesion between the conductive porous layer 21a and the cathode electrode 12a and the gas diffusion of the conductive porous layer 21a but also sufficiently ensures the durability against fluff.

Figure 3:
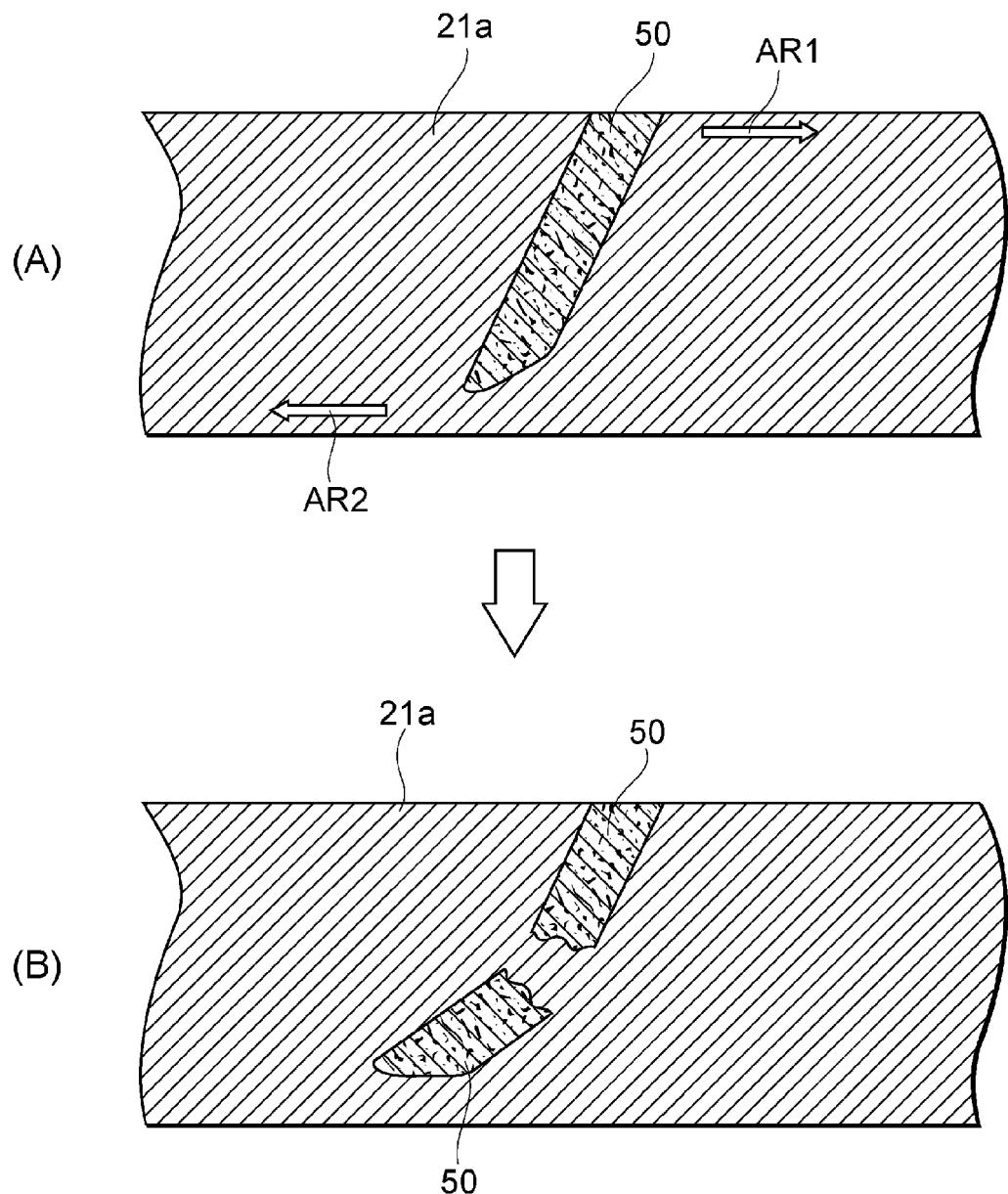
FIG. 3 is a view for schematically illustrating a state in which fluff is cut inside a fuel-cell gas diffusion layer.

The cathode-side gas diffusion layer 20a according to this embodiment has the function of, even when fluff enters the inside of the conductive porous layer 21a, cutting the fluff and preventing it from reaching the membrane electrode assembly 10. This will now be described with reference to FIG. 3. FIG. 3 is a view for schematically illustrating a state in which fluff is cut inside the cathode-side gas diffusion layer 20a.

As shown in FIG. 3(A), the cathode-side gas diffusion layer 20a may be brought into a state of being penetrated with fluff 50 (carbon fiber) from the diffusion-layer base material 22a. Such entry of the fluff 50 may occur during hot pressing performed during the manufacturing of the fuel cell 1, and also may occur due to vibration applied from the outside in the use of a fuel cell apparatus equipped with the fuel cell 1. When the state in FIG. 3(A) of being penetrated with the fluff 50 from the diffusion-layer base material 22a (upper portion of FIG. 3) continues, the fluff 50 may travel toward the membrane electrode assembly 10 (lower portion of FIG. 3) and then damage the membrane electrode assembly 10, and this is detrimental.

As explained above, the cathode-side gas diffusion layer 20a according to this embodiment is heated while being maintained in a state of involving a temperature difference in a baking step. As a result, the surface on the diffusion-layer base material 22 side (upper portion of FIG. 3), which is maintained at a high temperature, of the conductive porous layer 21a, has a relatively high Young's modulus. Meanwhile, the surface on the cathode electrode 12a side (lower portion of FIG. 3), which is maintained at a low temperature, of the conductive porous layer 21a, has a relatively low Young's modulus.

As described above, as the Young's modulus of the conductive porous layer 21a is inclined in the thickness direction, this does not lead to a uniform distortion generated in the conductive porous layer 21a when vibration is applied to the fuel cell 1, resulting in different magnitudes of such modulus between the diffusion-layer base material 22a side and the opposite side. More specifically, when vibration is applied to the fuel cell 1 so that forces in a shearing direction (forces in the directions shown by arrows AR1 and AR2 in FIG. 3) are applied to the conductive porous layer 21a, a small distortion in the directions occurs on the surface thereof, on the diffusion-layer base material 22a side, which has a high Young's modulus, and a large distortion in the directions occurs on the surface thereof, on the cathode electrode 12a side, which has a low Young's modulus. That is, in the conductive porous layer 21a, a part thereof close to the surface on the cathode electrode 12a side (lower portion of FIG. 3) varies, in the shearing direction (horizontal direction in FIG. 3), more greatly than a part thereof close to the surface on the diffusion-layer base material 22a side (upper portion of FIG. 3), whereby a force apt to bend the fluff 50 acts thereon. As a result, as shown in FIG. 3(B), the fluff 50 is cut inside the conductive porous layer 21a, thereby preventing the fluff 50 from reaching the membrane electrode assembly 10. As described above, the cathode-side gas diffusion layer 20a according to this embodiment has the function of cutting the fluff 50 therein.

The cathode-side gas diffusion layer 20a according to this embodiment is maintained in the state which involves a temperature difference in the baking step, thereby providing different exposure ratios of the conductive porous layer 21a between the surface on the diffusion-layer base material 22a side and the surface on the opposite side. A method of providing different exposure ratios along a thickness direction is not limited to the above-described method, and various methods may also be employed.

For example, the conductive porous layer 21a may be formed through heating multiple times instead of through one-time heating in this embodiment. In such case, a coating material is coated (more lightly than in this embodiment) onto the surface of the diffusion-layer base material 22a, and the coated material is heated at a high temperature, higher than 327° C., thereby forming a first layer of the conductive porous layer 21a. Thereafter, a coating material is further coated onto the upper surface of the conductive porous layer 21a, and the coated material is heated at a low temperature, lower than 327° C., thereby forming a second layer of the conductive porous layer 21a. By forming the conductive porous layer 21a with the above-described method, it is possible to form the conductive porous layer 21a having different exposure ratios along the thickness direction, as in this embodiment. The above explanation involves an example of the formation of the conductive porous layer 21a having two layers; however, one having three or more layers may also be formed.

Furthermore, multiple baked conductive porous layers 21a respectively having different exposure ratios may be prepared and subjected to hot pressing in a state of being arranged, in a stacked matter, onto the diffusion-layer base material 22, thereby forming the cathode-side gas diffusion layer 20a.

The embodiment of the present invention has been described above with reference to specific examples. However, the present invention is not limited to such specific examples. That is, such specific examples additionally involving appropriate design changes by a person skilled in the art may also be encompassed by the present invention as long as they comprise the features of the present invention. For example, the elements comprised in the above-stated specific examples and the relevant arrangements, materials, conditions, shapes, sizes, etc., may not be limited to the illustrated ones but changed appropriately. Further, the elements comprised in the above-described embodiment may be combined to the extent possible from a technical viewpoint, and such combinations may also be encompassed by the present invention, as long as they comprise the features of the present invention.

DESCRIPTION OF SYMBOLS

1: fuel cell
10: membrane electrode assembly
11: electrolyte membrane
12a: cathode electrode
12b: anode electrode
20: gas diffusion layer
20a: cathode-side gas diffusion layer
20b: anode-side gas diffusion layer
21a, 21b: conductive porous layer
22, 22a, 22b: diffusion-layer base material
30: separator
30a: cathode-side separator
30b: anode-side separator
31a, 31b: groove
50: fluff

What is claimed is:

1. A fuel-cell gas diffusion layer that is obtained by forming a conductive porous layer on one surface of a sheet-shaped diffusion-layer base material and that is stacked on a membrane electrode assembly in a state in which the conductive porous layer is in contact with a catalyst layer of the membrane electrode assembly,
wherein the conductive porous layer comprises:
a porous conductive member formed so as to have a porosity distribution substantially uniform in a stacking direction with respect to the membrane electrode assembly and formed so as to have a density of carbon substantially uniform in a stacking direction with respect to the membrane electrode assembly; and
a water-repellent member that is arranged dispersedly across an inside of the porous conductive member, and
wherein, when a ratio of a surface of the conductive member to a surface that is exposed without being covered with the water-repellent member is defined as an exposure ratio,
the exposure ratio of a surface, on a catalyst layer side, of the conductive porous layer, is higher than the exposure ratio, on the diffusion-layer base material side, of the conductive porous layer.

2. The fuel-cell gas diffusion layer according to claim 1, wherein the surface of the diffusion-layer base material side of the conductive porous layer has a higher Young's modulus than the surface of the catalyst layer side of the conductive porous layer.

3. A method of forming a fuel-cell gas diffusion layer that is obtained by forming a conductive porous layer on one surface of a sheet-shaped diffusion-layer base material and that is stacked on a membrane electrode assembly in a state in which the conductive porous layer is in contact with a catalyst layer of the membrane electrode assembly, the method comprising:
a preparation step of preparing a pasty coating material obtained by mixing a conductive material and a water-repellent material;
a coating step of coating the coating material onto one surface of the diffusion-layer base material so as to form a layer to be baked; and
a baking step of heating the layer to be baked,
wherein, in the baking step, heating is performed while maintaining a state in which a temperature of a part of the layer to be baked which contacts with the diffusion-layer base material is higher than a temperature of a surface of the layer to be baked which is opposite the diffusion-layer base material.

4. The method of forming a fuel-cell gas diffusion layer according to claim 3, wherein, in the baking step, heating is performed while maintaining a state in which a temperature of a part of the layer to be baked which contacts with the diffusion-layer base material is higher than a melting point of the water-repellent material and maintaining a state in which a temperature of a surface of the layer to be baked which is opposite to the diffusion-layer base material is lower than a melting point of the water-repellent material.

* * * * *